United States Patent
Enomoto et al.

(10) Patent No.: US 6,939,580 B2
(45) Date of Patent: Sep. 6, 2005

(54) WATER- AND OIL-REPELLENT TREATMENT OF TEXTILE

(75) Inventors: Takashi Enomoto, Settsu (JP); Ikuo Yamamoto, Settsu (JP); Norihito Otsuki, Settsu (JP); Teruyuki Fukuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 175 days.

(21) Appl. No.: 10/239,994

(22) PCT Filed: Mar. 29, 2001

(86) PCT No.: PCT/JP01/02616
§ 371 (c)(1),
(2), (4) Date: Sep. 27, 2002

(87) PCT Pub. No.: WO01/75215
PCT Pub. Date: Oct. 11, 2001

(65) Prior Publication Data
US 2003/0161953 A1 Aug. 28, 2003

(30) Foreign Application Priority Data
Mar. 30, 2000 (JP) .................................. 20000-093464

(51) Int. Cl.[7] .............................. B05D 3/02; B05D 3/04; B05D 3/10
(52) U.S. Cl. ..................... 427/354; 427/377; 427/430.1
(58) Field of Search .............................. 427/377, 430.1, 427/353, 354; 428/96, 365, 375

(56) References Cited

U.S. PATENT DOCUMENTS

| 5,073,442 A | 12/1991 | Knowlton et al. |
| 5,516,337 A | 5/1996 | Nguyen |
| 5,520,962 A | 5/1996 | Jones, Jr. |
| 5,851,595 A | 12/1998 | Jones, Jr. |
| 5,952,409 A | * 9/1999 | Boardman et al. .......... 524/185 |

FOREIGN PATENT DOCUMENTS

| JP | 50-148699 | 11/1975 |
| JP | 62-85080 | 4/1987 |
| JP | 2000-110069 | 4/2000 |
| WO | WO 98/50619 | 11/1998 |

OTHER PUBLICATIONS

International Search Report for PCT/JP01/02616, dated Jun. 26, 2001.
English Translation of International Preliminary Examination Report for PCT/JP01/02616 Dated Apr. 26, 2002.

* cited by examiner

Primary Examiner—Erma Cameron
(74) Attorney, Agent, or Firm—Sughrue Mion, PLLC

(57) ABSTRACT

A textile having durability of maintaining water- and sufficient oil-repellency and soil releasability before and after cleaning can be obtained by a method of preparing a treated textile, having steps of: (1) preparing a treatment liquid containing a water- and oil-repellent agent, (2) adjusting pH of the treatment liquid to at most 7, preferably at most 3, (3) applying the treatment liquid to a textile, (4) treating the textile with steam, and (5) washing the textile with water and dehydrating the textile, wherein the water- and oil-repellent agent is an emulsion containing a fluorine-containing compound and an emulsifier, the fluorine-containing compound is a fluorine-containing polymer and/or a fluorine-containing low molecular weight compound, and the emulsifier contains an anionic surface active agent having pKa of at least 2.

11 Claims, No Drawings

WATER- AND OIL-REPELLENT TREATMENT OF TEXTILE

FIELD OF THE INVENTION

The present invention relates to a treatment for imparting water repellency, oil repellency and soil releasability, and durability thereof to a textile. A method of the present invention is particularly useful for a carpet.

BACKGROUND OF THE INVENTION

Hitherto, various treatment methods have been proposed in order to impart water repellency, oil repellency and soil releasability to a textile such as a carpet. For example, a process (hereinafter, sometimes referred to as "Exhaust process") of treating a textile comprising decreasing a pH of a treatment liquid, applying the treatment liquid to the textile, thermally treating the textile with steam, washing the textile with water, and dehydrating the textile is proposed.

A method comprising the Exhaust process is proposed in U.S. Pat. Nos. 5,073,442, 5,520,962 and 5,516,337 and International Publication WO 98/50619.

U.S. Pat. No. 5,073,442 discloses a method of treating a textile, comprising conducting an Exhaust process by using a water- and oil-repellent agent comprising a fluorine-containing compound, a formaldehyde condensation product and an acrylic polymer. U.S. Pat. No. 5,520,962 discloses a method of treating a carpet, comprising conducting an Exhaust process by using a fluorine-containing compound and a polymeric binder. U.S. Pat. No. 5,516,337 discloses a method of treating a textile, comprising conducting an Exhaust process by using a fluorine-containing water- and oil-repellent agent and a metal compound such as aluminum sulfate. International Publication WO 98/50619 discloses a method of treating a carpet, comprising conducting an Exhaust process by using a fluorine-containing water- and oil-repellent agent and a salt such as a magnesium salt.

When these methods are used to conduct the Exhaust process, sufficient water-repellency, oil-repellency and soil releasability have not been obtained.

SUMMARY OF THE INVENTION

An object of the present invention is to give a textile excellent in water repellency, oil repellency and soil releasability, and durability thereof, when an Exhaust process is used.

The present invention provides a method of preparing a treated textile, comprising steps of:

(1) preparing a treatment liquid comprising a water- and oil-repellent agent,
(2) adjusting pH of the treatment liquid to at most 7, preferably at most 3,
(3) applying the treatment liquid to a textile,
(4) treating the textile with steam, and
(5) washing the textile with water and dehydrating the textile, wherein the water- and oil-repellent agent is an emulsion comprising a fluorine-containing compound and an emulsifier, the fluorine-containing compound is a fluorine-containing polymer and/or a fluorine-containing low molecular weight compound, and the emulsifier comprises an anionic surface active agent having pKa of at least 2, preferably at least 4.

The present invention also provides a textile prepared by the above-mentioned method.

DETAILED DESCRIPTION OF THE INVENTION

The procedure used in the present invention is an Exhaust process which comprises decreasing pH of a treatment liquid comprising a fluorine-containing compound, applying a treatment liquid to a textile, thermally treating the textile, washing the textile with water, and dehydrating the textile.

In the step (1) of the method of the present invention, the treatment liquid comprising the water- and oil-repellent agent, which is applied to the textile, is prepared. The treatment liquid comprising the water- and oil-repellent agent may be in the form of a solution or an emulsion, particularly an aqueous emulsion.

In the step (2) in the method of the present invention, pH of the treatment liquid is brought to at most 7. pH of the treatment liquid is preferably at most 3, more preferably at most 2. pH can be decreased by addition of an acid such as an aqueous solution of citraconic acid and an aqueous solution of sulfamic acid to the treatment liquid.

In the step (3) of the method of the present invention, the treatment liquid is applied to the textile. The water- and oil-repellent agent can be applied to a substrate to be treated (that is, the textile) by a know procedure. The application of the treatment liquid can be conducted by immersion, spraying and coating. Usually, the treatment liquid is diluted with an organic solvent or water, and is adhered to surfaces of the substrate by a well-known procedure such as an immersion coating, a spray coating and a foam coating to a fabric (for example, a carpet cloth), a yarn (for example, a carpet yarn) or an original fiber. If necessary, the treatment liquid is applied together with a suitable crosslinking agent, followed by curing. It is also possible to add mothproofing agents, softeners, antimicrobial agents, flame retardants, antistatic agents, paint fixing agents, crease-proofing agents, etc. to the treatment liquid. The concentration of the water- and oil-repellent agent active component (that is, the fluorine-containing compound) in the treatment liquid contacted with the substrate may be from 0.05 to 10% by weight, based on the treatment liquid. A stain blocking agent may used in the amount of, for example, 0 to 1,000 parts by weight, particularly 1 to 500 parts by weight, in terms of solid, per 100 parts by weight of the fluorine-containing compound.

In the step (4) of the method of the present invention, the textile is thermally treated. The thermal treatment can be conducted by applying a steam (for example, 90 to 110° C.) to the textile under a normal pressure for e.g., 10 seconds to 10 minutes.

In the step (5) of the method of the present invention, the textile is washed with water and dehydrated. The thermally treated textile is washed with water at least once. Then, in order to remove excess water, the textile is dehydrated by a usual dehydration procedure such as a centrifuging and vacuuming procedure. After the step (5), the textile can be dried.

The water- and oil repellent agent used in the present invention comprises the fluorine-containing compound and the emulsifier. The emulsifier comprises an anionic surface active agent having pKa of at least 2. The value of pKa is at least 2, preferably at least 2.5, more preferably at least 3, particularly at least 4. The pKa value is a value obtained by measuring a potential difference. The anionic surface active agent is preferably a carboxylate derivative, a phosphate derivative, a phosphorous derivative and/or a sulfurous derivative. In a preferred embodiment, the anionic surface active agent is a metal salt prepared from an acid ester of a monovalent organic alcohol and an inorganic acid.

Examples of the anionic surface active agent include a carboxylic acid-containing surface active agent and a phosphoric acid-containing surface active agent.

Examples of the anionic surface active agent having high pKa include sodium lauryl phosphate, sodium polyoxyethylene lauryl ether phosphate, sodium dipolyoxyethylene alkyl ether phosphate, sodium polyoxyethylene alkyl ether acetate, sodium lauroylmethylalanine and perfluoroalkyl carboxylate salt (Unidine DS-101 and 102 manufactured by Daikin Industries Ltd.).

The anionic surface active agent having high pKa is preferably a compound having a phosphate group, particularly preferably a phosphate ester.

The water- and oil-repellent agent of the present invention may contain, as the surface active agent, in addition to the high pKa anionic surface active agent, another anionic surface active agent (that is, an anionic surface active agent having low pKa) and/or a nonionic surface active agent.

Examples of the nonionic surface active agent include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonyl phenyl ether, polyoxyethylene octyl phenyl ether, polyoxyethylene monolaurate, polyoxyethylene monostearate, polyoxyethylene mono-oleate, sorbitan monolaurate, sorbitan monostearate, sorbitan monopalmitate, sorbitan monostearate, sorbitan mono-oleate, sorbitan sesqui-oleate, sorbitan trioleate, polyoxyethylene sorbitan monolaurate, polyoxyethylene sorbitan monopalmitate, polyoxyethylene sorbitan monostearate, polyoxyethylene sorbitan mono-oleate, polyoxyethylene polyoxypropylene block polymer, polyglycerin fatty acid ester, polyether-modified silicone oil (SH3746, SH3748, SH3749 and SH3771 manufactured by Toray Dow Corning Silicone Co., Ltd.), perfluoroalkyl ethylene oxide adduct (Unidine DS-401 and DS-403 manufactured by Daikin Industries Ltd.), fluoroalkyl ethylene oxide adduct (Unidine DS-406 manufactured by Daikin Industries Ltd.), and perfluoroalkyl oligomer (Unidine DS-451 manufactured by Daikin Industries Ltd.).

The fluorine-containing compound is a fluorine-containing polymer and/or a fluorine-containing low molecular weight compound.

The fluorine-containing polymer may be a polymer comprising a repeat unit derived from a fluoroalkyl group-containing monomer such as a fluoroalkyl group-containing (meth)acrylate, a fluoroalkyl group-containing maleate or fumarate, or a fluoroalkyl group-containing urethane.

The fluoroalkyl group-containing (meth)acrylate ester may be of the formula:

wherein Rf is a fluoroalkyl group having 3 to 21 carbon atoms, $R^{11}$ is a hydrogen atom or a methyl group, and A is a divalent organic group.

In the above formula, A may be a linear or branched alkylene group having 1 to 20 carbon atoms, a $—SO_2N(R^{21})R^{22}—$ group or a $—CH_2CH(OR^{23})CH_2—$ group ($R^{21}$ is an alkyl group having 1 to 10 carbon atoms, $R^{22}$ is a linear or branched alkylene group having 1 to 10 carbon atoms, and $R^{23}$ is a hydrogen atom or an acyl group having 1 to 10 carbon atoms).

Examples of the fluoroalkyl group-containing (meth)acrylate are as follows:

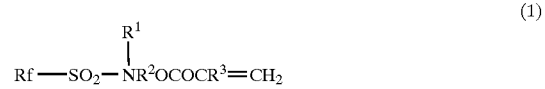

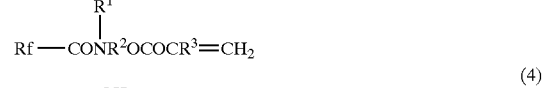

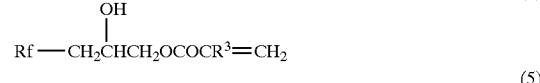

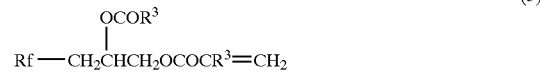

wherein Rf is a fluoroalkyl group having 3 to 21 carbon atoms, $R^1$ is a hydrogen atom or an alkyl group having 1 to 10 carbon atoms, $R^2$ is an alkylene group having 1 to 10 carbon atoms, $R^3$ is a hydrogen atom or a methyl group, and Ar is arylene group optionally having a substituent, and n is an integer of 1 to 10.

Specific examples of the fluoroalkyl group-containing (meth)acrylate are as follows:

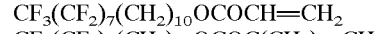
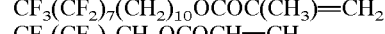
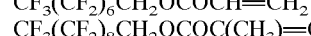
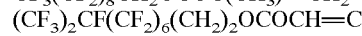
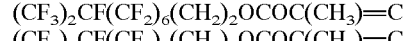
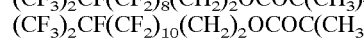
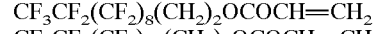
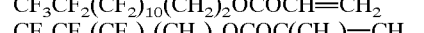
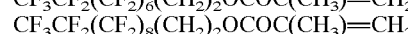
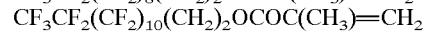
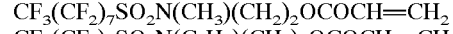
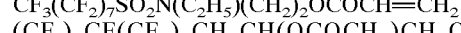
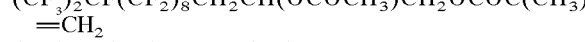
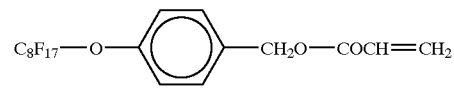
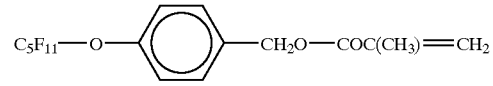
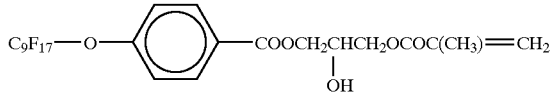

A fluoroalkyl group-containing urethane monomer deriving the fluorine-containing polymer can be prepared by reacting:
(a) a compound having at least two isocyanate groups,
(b) a compound having one carbon-carbon double bond and at least one hydroxyl group or amino group, and (c) a fluorine-containing compound one hydroxyl group or amino group.

Examples of the compound (a) include the followings:

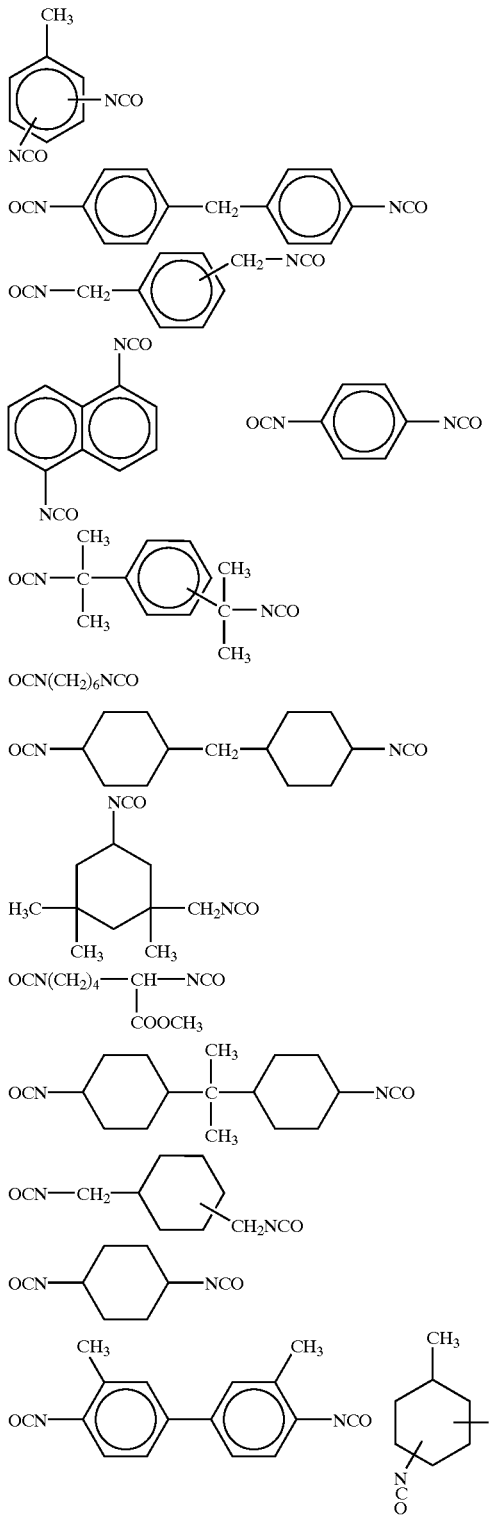

The compound (a) is preferably a diisocyanate. However, a triisocyanate and a polyisocyanate can be also used for the reaction.

For example, a trimer of diisocyanate, polymeric MDI (diphenylmethane diisocyanate) and an adduct of diisocyanate with a polyhydric alcohol such as trimethylol propane, trimethylol ethane and glycerol can be also used for the reaction.

Examples of the triisocyanate and the polyisocyanate are as follows:

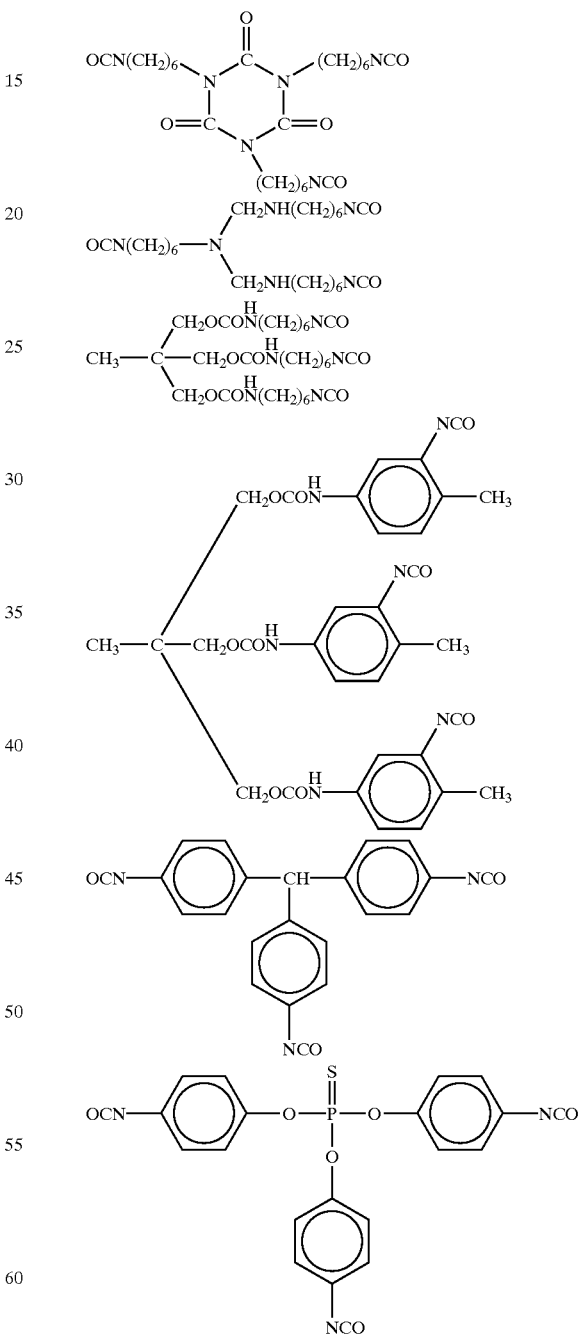

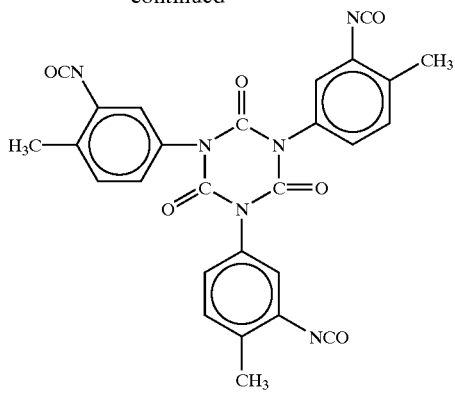

The compound (b) may be, for example, a compound of each of the formulas:

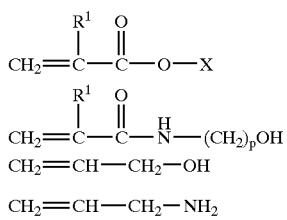

In the formula, $R^1$ is a hydrogen atom or a methyl group. X is as follows:

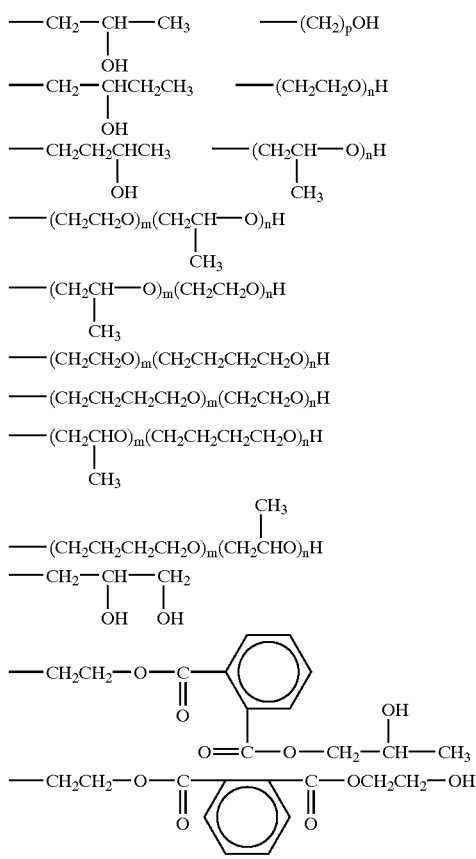

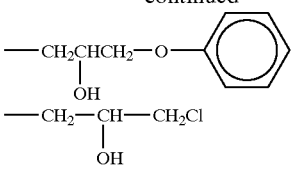

wherein m and n is a number of 1 to 300.

The compound (c) may be a compound of the formula:

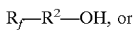

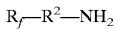

wherein $R_f$ is a fluoroalkyl group having 1 to 22 carbon atoms, and $R^2$ is an alkylene group having 1 to 10 carbon atoms and may have a heteroatom.

Examples of the compound (c) may be the followings:

$CF_3CH_2OH$
$F(CF_2)_8CH_2CH_2OH$
$F(CF_2)_6(CH_2)_6OH$

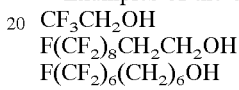

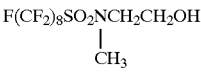

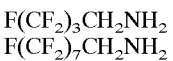

The compounds (a), (b) and (c) may be reacted such that when the compound (a) is a diisocyanate, both the compounds (b) and (c) are in amounts of 1 mol based on 1 mol of the compound (a); when the compound (a) is a triisocyanate, the compound (b) is in an amount of 1 mol and the compound (c) is in an amount of 2 mol based on 1 mol of the compound (a).

The fluorine-containing polymer constituting the water- and oil-repellent agent may comprise:

(I) a repeat unit derived from a monomer having a fluoroalkyl group, and (II) a repeat unit derived from a fluorine-free monomer.

The fluorine-containing polymer constituting the water- and oil-repellent agent may comprise:

(I) a repeat unit derived from a monomer having a fluoroalkyl group, (II) a repeat unit derived from a fluorine-free monomer, and (III) a repeat unit derived from a crosslinkable monomer.

Examples of the monomer having fluoroalkyl group constituting the repeat unit (I) include the same as the above-mentioned fluoroalkyl group-containing monomer such as a fluoroalkyl group-containing (meth)acrylate.

The repeat unit (II) is preferably derived from a fluorine-free olefinically unsaturated monomer. Non-limiting examples of a preferable monomer constituting the repeat unit (II) include, for example, ethylene, vinyl acetate, vinyl chloride such as vinyl chloride, vinylidene halide such as vinylidene chloride, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, vinyl alkyl ether and isoprene.

The fluorine-containing polymer preferably contains vinyl halide or vinylidene halide.

The monomer constituting the repeat unit (II) may be a (meth)acrylate ester having an alkyl group. The number of carbon atoms of the alkyl group may be from 1 to 30, for example, from 6 to 30, e.g., from 10 to 30. For example, the monomer constituting the repeat unit (II) may be acrylates of the general formula:

wherein $A^3$ is a hydrogen atom or a methyl group, and $A^4$ is an alkyl group represented by $C_nH_{2n+1}$ (n=1 to 30). The copolymerization with this monomer can optionally improve various properties such as water- and oil-repellency and soil releasability; cleaning durability, washing durability and abrasion resistance of said repellency and releasability; solubility in solvent; hardness; and feeling.

The crosslinkable monomer constituting the repeat unit (III) may be a fluorine-free olefinically unsaturated monomer having at least two reactive groups. The crosslinkable monomer may be a compound having at least two carbon-carbon double bonds, or a compound having at least one carbon-carbon double bond and at least one reactive group.

Examples of the crosslinkable monomer include diacetoneacrylamide, (meth)acrylamide, N-methylolacrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene and glycidyl (meth)acrylate, to which the crosslinkable monomer is not limited. The copolymerization with this monomer can optionally improve various properties such as water-repellency and soil releasability; cleaning durability and washing durability of said repellency and releasability; solubility in solvent; hardness; and feeling.

The fluorine-containing polymer preferably has a weight average molecular weight of 2,000 to 1,000,000.

Preferably, the amount of the repeat unit (I) is from 40 to 90% by weight, more preferably from 50 to 80% by weight, the amount of the repeat unit (II) is from 5 to 60% by weight, more preferably from 10 to 40% by weight, and the amount of the repeat unit (III) is from 0 to 10% by weight, more preferably 0.1 to 10% by weight, for example 0.5 to 10% by weight, based on the fluorine-containing polymer.

The fluorine-containing polymer in the present invention can be produced by any polymerization method, and the conditions of the polymerization reaction can be arbitrary selected. The polymerization method includes, for example, solution polymerization and emulsion polymerization. Among them, the emulsion polymerization is particularly preferred.

In order to obtain a copolymer dispersion in water, which is superior in storage stability, it is desirable that the monomers are atomized in water by using an emulsifying device capable of applying a strong shattering energy (e.g., a high-pressure homogenizer and an ultrasonic homogenizer) and then polymerized with using the oil-soluble polymerization initiator. In order to disperse the monomer, the emulsifier is preferably mixed with the monomers before an emulsification process.

The fluorine-containing low molecular weight compound may have a molecular weight of less than 2,000, for example, from 200 to 1,800, particularly from 500 to 1,500 and may be a fluoroalkyl group-containing compound.

The fluorine-containing low molecular weight compound may be, for example, a fluoroalkyl group-containing urethane or a fluoroalkyl group-containing ester.

The fluoroalkyl group-containing urethane can be prepared by reacting
(i) a compound having at least two isocyanate groups, with
(ii) a fluorine-containing compound having one hydroxyl group, amino group or epoxy group.

Examples of the compound having at least two isocyanate groups (i) are the same as those of the above-mentioned compound having at least two isocyanate groups (a) used for the fluoroalkyl group-containing urethane monomer deriving the fluorine-containing copolymer.

Specific examples of the fluorine-containing compound having one hydroxyl group, amino group or epoxy group (ii) are as follows:

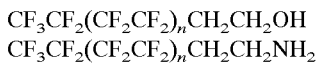

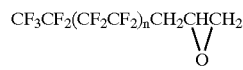

[n is from 2 to 8]

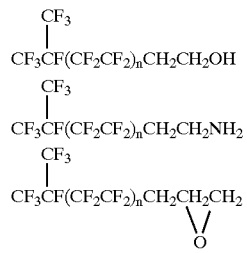

[n is from 2 to 8]

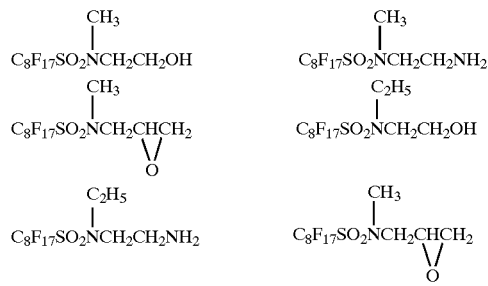

The fluoroalkyl group-containing ester can be prepared by reacting:
(iii) a polybasic carboxylic acid compound, with
(ii) a fluorine-containing compound having one hydroxyl group, amino group or epoxy group.

The polybasic carboxylic acid compound is a compound having at least 2, preferably 2 to 4 carboxylic acid groups.

Specific examples of the polybasic carboxylic acid compound are as follows:

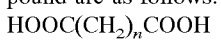

[n is 2, 4 or 6]

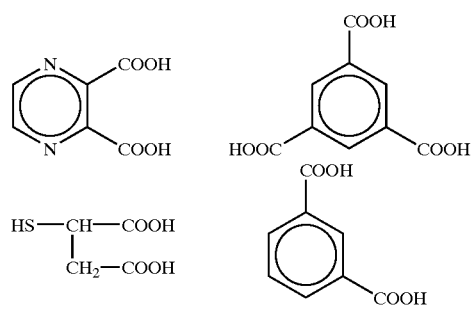

-continued

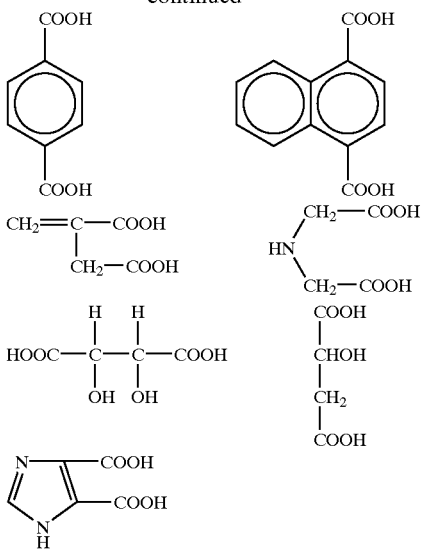

Examples of the fluorine-containing compound having one hydroxyl group, amino group or epoxy group (ii) forming the fluoroalkyl group-containing ester are the same as those of the above-mentioned fluorine-containing compound having one hydroxyl group, amino group or epoxy group (ii) forming the fluoroalkyl group-containing urethane.

The fluorine-containing compound may be the fluorine-containing polymer, the fluorine-containing low molecular weight compound, or a mixture of the fluorine-containing polymer and the fluorine-containing low molecular weight compound.

The amount of the fluorine-containing compound is at most 60% by weight, preferably from 1 to 40% by weight, for example, 1 to 30% by weight, based on the water- and oil-repellent agent. The amount of the emulsifier may be from 0.5 to 15 parts by weight, for example, 0.5 to 10 parts by weight, based on 100 parts by weight of the fluorine-containing compound.

The amount of the anionic surface active agent having pKa of at least 2 (preferably, at least 4) may be at least 5% by weight, for example, at least 10% by weight, particularly at least 20% by weight, especially at least 30% by weight, based on the amount of the emulsifier.

The substrate to be treated in the present invention is preferably a textile, particularly a carpet. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers. The method of the present invention can be suitably used in carpets made of nylon fibers, polypropylene fibers and/or polyester fibers, because the present invention provides excellent resistance to a detergent solution and brushing (mechanical).

The textile may be in any form such as a fiber and a fabric. When the carpet is treated according to the method of the present invention, the carpet may be formed after the fibers or yarns are treated according to the present invention, or the formed carpet may be treated according to the present invention. The water- and oil-repellent agent can be used in the state that the fluorine-containing compound is diluted with a liquid medium such as water to the content of 0.02 to 30% by weight, preferably 0.02 to 10% by weight, particularly 0.1 to 10% by weight.

PREFERRED EMBODIMENTS OF THE INVENTION

The following Examples further illustrate the present invention in detail but are not to be construed to limit the scope thereof. Water repellency and an adhesion rate of the carpets obtained in the Examples and Comparative Example were evaluated.

Test procedures of the water repellency and the adhesion rate are as follows.

1) Water Repellency

Droplets of the isopropyl alcohol (IPA)/water mixture liquid shown in Table 1 are softly positioned on a carpet surface and a maximum content of IPA in a liquid maintaining a droplet shape is taken as a result of water repellency.

Specifically, the following procedure is conducted:

A carpet treated with a water- and oil-repellent agent is stored in a thermo-hygrostat having a temperature of 21° C. and a humidity of 65% for at least 4 hours. A test liquid (having the composition shown in Table 1) is also stored at 21° C. A test room is air-conditioned so that the room has a temperature of 21° C. Droplets of the test liquid in an amount of 50 μL are dropped by a micropipette on the carpet (Droplets have a diameter of 5 mm). The micropipette is positioned vertically and droplets are softly dropped. 5 droplets are positioned. If 4 or 5 droplets remain on the carpet after standing for 10 seconds, the test liquid passes the test. The water repellency is expressed by a maximum content (% by volume) of isopropyl alcohol (IPA) in the test liquid which passes the test.

TABLE 1

| Mixture composition (% by volume) | |
|---|---|
| Isopropyl alcohol | Water |
| 100 | 0 |
| 90 | 10 |
| 80 | 20 |
| 70 | 30 |
| 60 | 40 |
| 50 | 50 |
| 40 | 60 |
| 30 | 70 |
| 25 | 75 |
| 20 | 80 |
| 15 | 85 |
| 10 | 90 |
| 5 | 95 |
| 2 | 98 |
| 0 | 100 |

2) Adhesion Rate

At the time when a carpet is treated with a repellent agent, a measurement value of a fluorine content present on a carpet fiber is taken as "F (absorption) ppm". A fluorine content present on the carpet fiber after Exhaust treatment is taken as "F (adhesion) ppm". The fluorine content is measured according to an oxygen combustion method.

The adhesion rate (%) can be determined according to the following equation.

Adhesion rate=[$F$(adhesion)/$F$(absorption)]×100

PREPARATIVE EXAMPLE 1

50 g of perfluoroalkyl acrylate: $CH_2=CH-COOCH_2CH_2-Rf$ (a mixture wherein a molar ratio of $Rf=C_6F_{13}$, $C_8F_{17}$, $C_{10}F_{21}$, $C_{12}F_{25}$ and $C_{14}F_{29}$ was 2:40:30:15:3, an average molecular weight of 528), 15 g of stearyl acrylate and 15 g of 2-ethylhexyl methacrylate were sufficiently mixed and dissolved. 3 g of sorbitan monooleate (a nonionic emulsifier), 3 g of polyoxyethylene(n=20)lauryl ether (a nonionic emulsifier), 4 g of potassium stearyl phosphate (a phosphorus-containing anionic emulsifier, $pKa_1$=2.5, $pKa_2$=5.6), 0.15 g of lauryl mercaptan, 25 g of tripropylene glycol and 160 g of deionized water were added and the mixture was emulsified by a high pressure homogenizer. The resultant emulsion was charged into a 500 mL four-necked flask equipped with a reflux condenser, a nitrogen introducing tube, a thermometer and a stirrer, and the emulsion was maintained under a nitrogen flow at 60° C. for about 1 hour. A solution of an initiator, ammonium persulfate (0.5 g) in water (5 g) was added to initiate the polymerization and the mixture was stirred at 60° C. for 3 hours to give an aqueous emulsion of a copolymer. The composition of monomers in the copolymer was almost the same as the charged monomer composition.

PREPARATIVE EXAMPLE 2

200 g of perfluoroalkyl acrylate: $CH_2=CH-COOCH_2CH_2-Rf$ (a mixture wherein a molar ratio of $Rf=C_6F_{13}$, $C_8F_{17}$, $C_{10}F_{21}$, $C_{12}F_{25}$ and $C_{14}F_{29}$ was 2:40:30:15:3, an average molecular weight of 528) and 15 g of stearyl acrylate were sufficiently mixed and dissolved. 20 g of polyoxyethylene(n=15)octyl phenyl ether (a nonionic emulsifier), 10 g of potassium stearyl phosphate salt (a phosphorus-containing anionic emulsifier, $pKa_1$=2.5, $pKa_2$=5.6), 0.15 g of lauryl mercaptan, 70 g of tripropylene glycol and 450 g of deionized water were added and the mixture was emulsified by a high pressure homogenizer. The resultant emulsion was charged into a 1 L autoclave, and the atmosphere was replaced with nitrogen. 70 g of vinyl chloride was pressed into the autoclave. A solution of an initiator, ammonium persulfate (1.5 g) in water (10 g) was added and the temperature of the mixture was increased to 60° C. to initiate the polymerization. The mixture was stirred at 60° C. for 6 hours to give an aqueous emulsion of a copolymer.

PREPARATIVE EXAMPLE 3

50 g of perfluoroalkyl acrylate: $CH_2=CH-COOCH_2CH_2-Rf$ (a mixture wherein a molar ratio of $Rf=C_6F_{13}$, $C_8F_{17}$, $C_{10}F_{21}$, $C_{12}F_{25}$ and $C_{14}F_{29}$ was 2:40:30:15:3, an average molecular weight of 528), 15 g of stearyl acrylate and 15 g of 2-ethyihexyl methacrylate were sufficiently mixed and dissolved. 3 g of sorbitan monooleate (a nonionic emulsifier), 3 g of polyoxyethylene(n=20)lauryl ether (a nonionic emulsifier), 12 g of sodium lauryl sulfate (an anionic emulsifier, pKa=2), 0.15 g of lauryl mercaptan, 25 g of tripropylene glycol and 160 g of deionized water were added and the mixture was emulsified by a high pressure homogenizer. The resultant emulsion was charged into a 500 mL four-necked flask equipped with a reflux condenser, a nitrogen introducing tube, a thermometer and a stirrer, and the emulsion was maintained under a nitrogen flow at 60° C. for about 1 hour. A solution of an initiator, ammonium persulfate (0.5 g) in water (5 g) was added to initiate the polymerization and the mixture was stirred at 60° C. for 3 hours to give an aqueous emulsion of a copolymer. The composition of monomers in the copolymer was almost the same as the charged monomer composition.

PREPARATIVE EXAMPLE 4

200 g of perfluoroalkyl acrylate: $CH_2=CH-COOCH_2CH_2-Rf$ (a mixture wherein a molar ratio of $Rf=C_6F_{13}$, $C_8F_{17}$, $C_{10}F_{21}$, $C_{12}F_{25}$ and $C_{14}F_{29}$ was 2:40:30:15:3, an average molecular weight of 528) and 15 g of stearyl acrylate were sufficiently mixed and dissolved. 20 g of polyoxyethylene(n=15)octyl phenyl ether (a nonionic emulsifier), 10 g of sodium lauryl sulfate (an anionic emulsifier, pKa=2), 0.15 g of lauryl mercaptan, 70 g of tripropylene glycol and 450 g of deionized water were added and the mixture was emulsified by a high pressure homogenizer. The resultant emulsion was charged into a 1 L autoclave, and the atmosphere was replaced with nitrogen. 70 g of vinyl chloride was pressed into the autoclave. A solution of an initiator, ammonium persulfate (1.5 g) in water (10 g) was added and the temperature of the mixture was increased to 60° C. to initiate the polymerization. The mixture was stirred at 60° C. for 6 hours to give an aqueous emulsion of a copolymer. The composition of monomers in the copolymer was almost the same as the charged monomer composition.

EXAMPLE 1

0.9 g of the emulsion prepared in Preparative Example 1 and 5 g of a stain blocking agent (FX-657, manufactured by 3M) were diluted with water to the amount of 1,000 g. A 10% aqueous sulfamic acid solution was added to the emulsion so that pH of the emulsion was 1.5, to give a treatment liquid.

A carpet (8.9 cm×18.2 cm, nylon-6,6, cut pile, density: 36 oz/yd$^2$) was immersed in this treatment liquid for 30 seconds and squeezed to have a WPU (wet pick up) amount of 300%. Then, a normal-pressure steamer treatment (temperature: 100° C. to 107° C.) was conducted for 90 seconds under the state that a pile surface was upside. The carpet was lightly rinsed with 2 L of water and then centrifugal dehydration was conducted to give a WPU amount of 25%. Finally, the carpet was thermally cured at 110° C. for 10 minutes. Then, the evaluation of water repellency and adhesion rate was conducted. The results are shown in Table A.

EXAMPLE 2

0.8 g of the emulsion prepared in Preparative Example 2 and 5 g of a stain blocking agent (FX-657, manufactured by 3M) were diluted with water to the amount of 1,000 g. A 10% aqueous sulfamic acid solution was added to the emulsion so that pH of the emulsion was 1.5, to give a treatment liquid. The treatment and the evaluation were conducted as in Example 1. The results are shown in Table A.

COMPARATIVE EXAMPLE 1

0.9 g of the emulsion prepared in Preparative Example 3 and 5 g of a stain blocking agent (FX-657, manufactured by 3M) were diluted with water to the amount of 1,000 g. A 10% aqueous sulfamic acid solution was added to the emulsion so that pH of the emulsion was 1.5, to give a treatment liquid.

A carpet (8.9 cm×18.2 cm, nylon-6,6, cut pile, density: 36 oz/yd$^2$) was immersed in this treatment liquid for 30 seconds and squeezed to have a WPU (wet pick up) amount of 300%. Then, a normal-pressure steamer treatment (temperature: 100° C. to 107° C.) was conducted for 90 seconds under the state that a pile surface was upside. The carpet was lightly rinsed with 2 L of water and then centrifugal dehydration was conducted to give a WPU amount of 25%. Finally, the carpet was thermally cured at 110° C. for 10 minutes. Then, the evaluation of water repellency and adhesion rate was conducted. The results are shown in Table A.

COMPARATIVE EXAMPLE 2

0.8 g of the emulsion prepared in Preparative Example 4 and 5 g of a stain blocking agent (FX-657, manufactured by 3M) were diluted with water to the amount of 1,000 g. A 10% aqueous sulfamic acid solution was added to the emulsion so that pH of the emulsion was 1.5, to give a treatment liquid. The treatment and the evaluation were conducted as in Comparative Example 1. The results are shown in Table A.

TABLE A

|  | Ex. 1 | Ex. 2 | Com. Ex. 1 | Com. Ex. 2 |
|---|---|---|---|---|
| Adhesion rate (%) | 88 | 86 | 73 | 72 |
| Water repellency | 100 | 90 | 80 | 70 |

What is claimed is:

1. A method of preparing a treated textile, comprising steps of:
    (1) preparing a treatment liquid comprising a water- and oil-repellent agent,
    (2) adjusting pH of the treatment liquid to at most 7,
    (3) applying the treatment liquid to a textile,
    (4) treating the textile with steam, and
    (5) washing the textile with water and dehydrating the textile,
    wherein the water- and oil-repellent agent is an emulsion comprising a fluorine-containing compound and an emulsifier, the fluorine-containing compound is a fluorine-containing polymer and/or a fluorine-containing low molecular weight compound, and the emulsifier comprises an anionic surface active agent having pKa of at least 2, wherein the anionic surface active agent is a metal salt prepared from an acid ester of a monovalent organic alcohol and an inorganic acid.

2. The method according to claim 1, wherein the fluorine-containing polymer comprises:
    (I) a repeat unit derived from a monomer having a fluoroalkyl group.

3. The method according to claim 1, wherein the fluorine-containing polymer comprises:
    (I) a repeat unit derived from a monomer having a fluoroalkyl group, and one or both of (II) and (III):
    wherein (II) is a repeat unit derived from a fluorine-free monomer, and
    (III) is a repeat unit derived from a crosslinkable monomer.

4. A textile obtainable by the method according to claim 1.

5. A carpet obtainable by the method according to claim 1.

6. The carpet according to claim 5, wherein the carpet comprises a nylon fiber, a polypropylene fiber and/or a polyester fiber.

7. The method according to claim 1, wherein the emulsifier comprises an anionic surface active agent having a pKa of at least 4.

8. The method according to claim 1, wherein the fluorine-containing compound constituting the emulsion comprises a repeat unit derived from a fluoroalkyl group-containing monomer, a fluoroalkyl group containing maleate or fumarate, or a fluoroalkyl group-containing urethane.

9. A water- and oil-repellent agent usable in a method of treating a textile, comprising steps of:
    (1) preparing a treatment liquid comprising a water- and oil-repellent agent,
    (2) adjusting pH of the treatment liquid to at most 7,
    (3) applying the treatment liquid to a textile,
    (4) treating the textile with steam, and
    (5) washing the textile with water and dehydrating the textile,
    wherein the water- and oil-repellent agent is an emulsion comprising a fluorine-containing compound and an emulsifier, the fluorine-containing compound is a fluorine-containing polymer and/or a fluorine-containing low molecular weight compound, and the emulsifier comprises an anionic surface active agent having pKa of at least 2, wherein the anionic surface active agent is a metal salt prepared from an acid ester of a monovalent organic alcohol and an inorganic acid.

10. The water- and oil-repellent agent according to claim 9, wherein the anionic surface active agent has a pKa of at least 4.

11. The water- and oil-repellent agent according to claim 9, wherein the fluorine-containing compound constituting the emulsion comprises a repeat unit derived from a fluoroalkyl group-containing monomer, a fluoroalkyl group containing maleate or fumarate, or a fluoroalkyl group-containing urethane.

* * * * *